United States Patent [19]

Hertell

[11] Patent Number: 4,737,087
[45] Date of Patent: Apr. 12, 1988

[54] DRIVE SHAFT SEAL FOR GEAR PUMP AND METHOD

[75] Inventor: Siegfried Hertell, Radevormwald, Fed. Rep. of Germany

[73] Assignee: Barmag AG, Remscheid, Fed. Rep. of Germany

[21] Appl. No.: 807,805

[22] Filed: Dec. 10, 1985

[30] Foreign Application Priority Data

Dec. 10, 1984 [DE] Fed. Rep. of Germany ....... 3444964

[51] Int. Cl.$^4$ .......................... F04C 2/18; F04C 15/00; F16J 15/40; B29F 3/08
[52] U.S. Cl. .......................................... 418/1; 418/2; 418/100; 418/102; 418/104; 418/206; 277/58; 277/59
[58] Field of Search ............... 418/102, 104, 206, 205, 418/1, 2, 100; 277/3, 15, 71, 79, 358, 59; 251/319, 323

[56] References Cited

U.S. PATENT DOCUMENTS

| | | | |
|---|---|---|---|
| 754,032 | 3/1904 | Wright | 251/319 |
| 1,686,027 | 10/1928 | Newbury | 277/3 |
| 2,257,011 | 9/1941 | Hillier | 277/15 |
| 2,350,448 | 6/1944 | Collins | 277/58 |
| 2,466,025 | 4/1949 | Hanson | 277/15 |
| 3,081,095 | 3/1963 | Hamrick | 277/3 |
| 3,137,239 | 6/1964 | Dahl | 418/206 |
| 3,201,012 | 8/1965 | De Malglaive | 251/319 |
| 3,971,541 | 7/1976 | Griffin | 251/320 |
| 4,060,353 | 11/1977 | Akimoto | 418/104 |
| 4,183,714 | 1/1980 | Gosling | 277/3 |
| 4,193,603 | 3/1980 | Sood | 277/3 |
| 4,395,141 | 7/1983 | Pietsch | 277/3 |
| 4,420,291 | 12/1983 | Winstead | 418/102 |
| 4,465,442 | 8/1984 | Lang | 418/206 |
| 4,475,735 | 10/1984 | Smuda | 277/3 |
| 4,515,512 | 5/1985 | Hertell et al. | 418/1 |

FOREIGN PATENT DOCUMENTS 322778 12/1929 United Kingdom ................ 418/102

OTHER PUBLICATIONS

Chemiefasern/Textilindustrie, Dec. 1977, pp. 1078–1083.

Primary Examiner—Carlton R. Croyle
Assistant Examiner—Jane E. Obee
Attorney, Agent, or Firm—Bell, Seltzer, Park & Gibson

[57] ABSTRACT

A seal for the drive shaft of a gear pump for polymeric materials dissolved in a fluid solvent is disclosed, and which is adapted to prevent the polymeric material from leaking and hardening on the drive shaft. The seal includes a pair of axially spaced apart annular packing seals surrounding the drive shaft so as to define an annular chamber, and means for supplying a pressurized shielding inert gas, such as nitrogen, into the annular chamber. An outlet line is connected to the lowest portion of the annular space and leads to an air tight container which also contains a shielding inert atmosphere, and such that any polymeric material which leaks along the drive shaft and enters the annular chamber remains in solution, and is withdrawn into the air tight container. A valve is also provided on the container for periodically draining the withdrawn polymeric material therefrom. The shielding inert atmosphere in the annular chamber and the container prevents the polymeric material from hardening, which can lead to the galling or scoring of the packing seals.

13 Claims, 2 Drawing Sheets

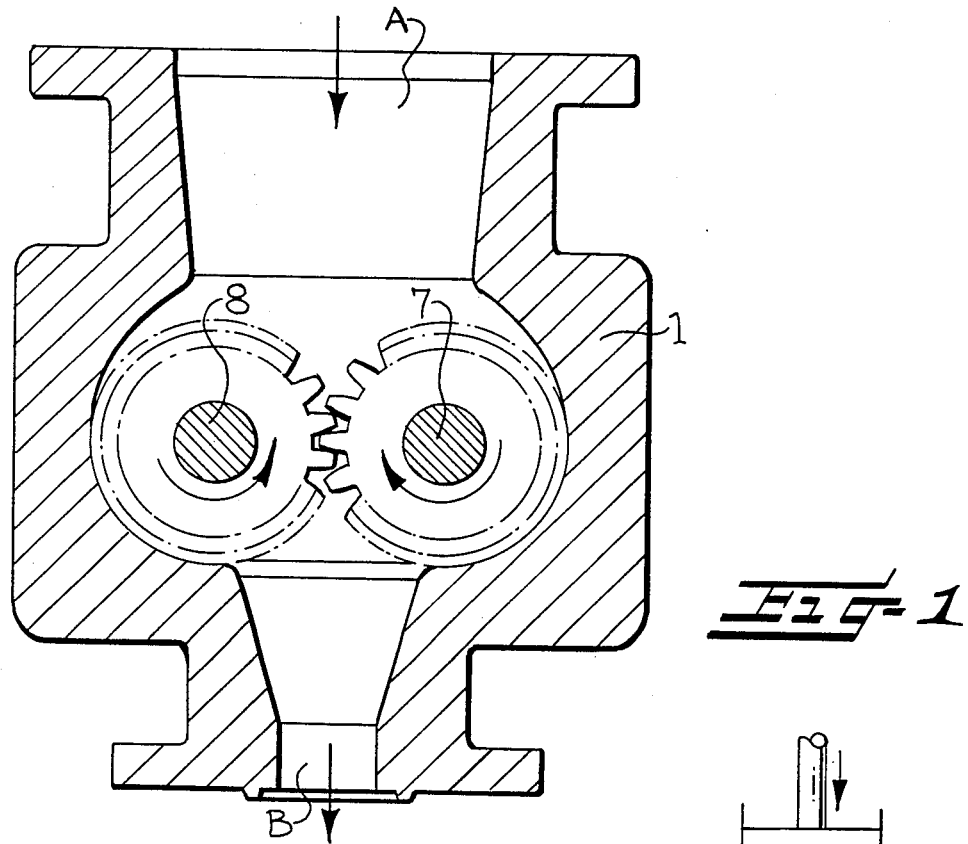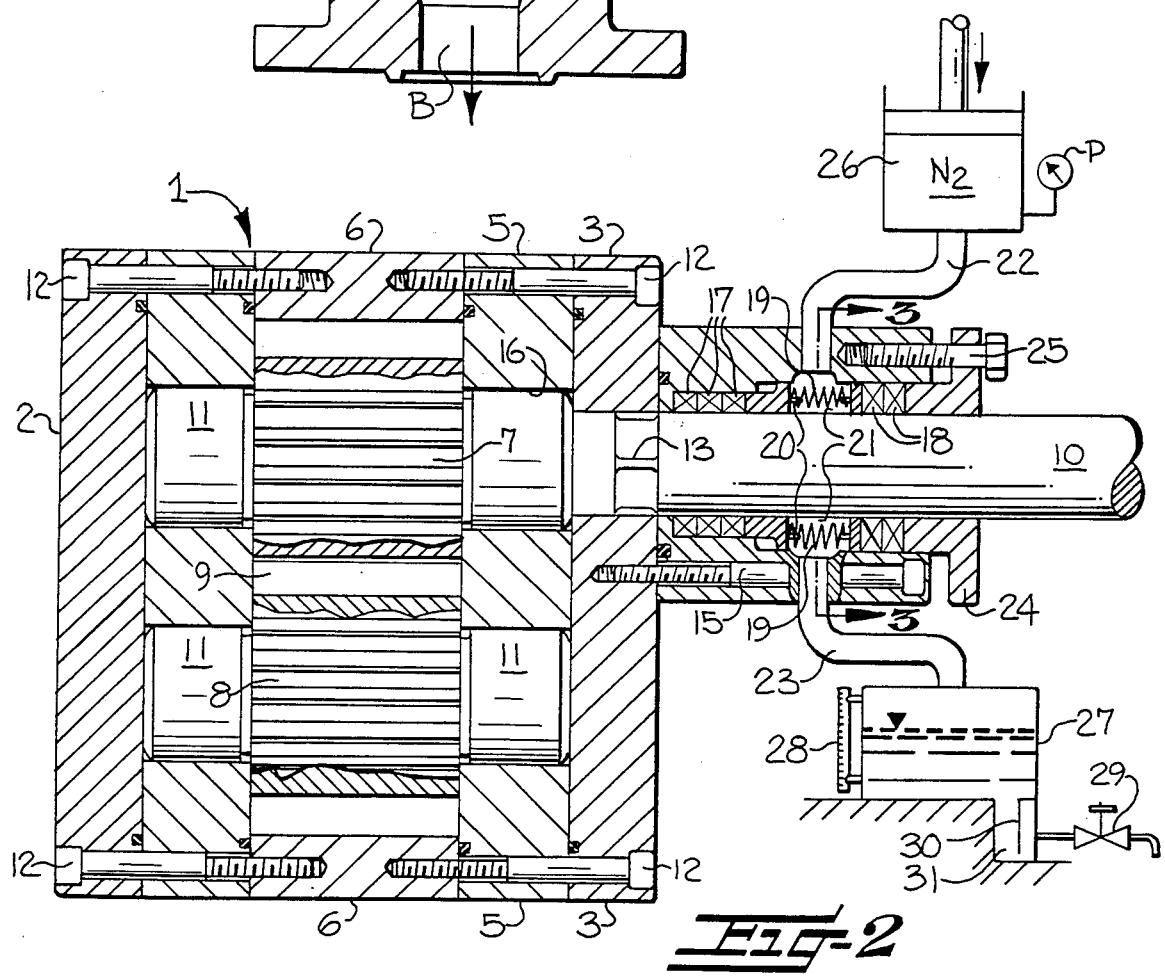

DRIVE SHAFT SEAL FOR GEAR PUMP AND METHOD

The present invention is directed to a seal construction and sealing method for the drive shaft of a discharge or metering gear pump of the type adapted to convey a solution of a polymeric material and a solvent. More particularly, the present invention relates to a seal for the drive shaft of a gear pump which includes a pair of gears rotatably supported in a pump housing, and with the gears meshing with each other in a sealing section of the housing. The drive shaft is journaled in a bearing in the pump housing which is lubricated by the solution of the polymeric material, and the outer end portion of the drive shaft is sealed with respect to the pump housing.

A gear pump of the above described type is also disclosed in Chemiefasern/Textilindustrie 1977, at page 1083, and has proven useful for conveying and metering spinning materials, either in the form of a melt or a spinning solution of a plastic used for melt spinning, wet spinning or a dry spinning process. The present invention is particularly directed to a dry spinning process, such as the spinning of cellulose acetate, and wherein the cellulose is dissolved in acetone solvent, and the resulting solution is spun through a spinneret. The filaments are thereafter hardened as they pass through a spinning chimney, where air is circulated for evaporating the solvent.

The fact that the drive shaft is journaled in a bearing in the pump housing and is lubricated by the polymeric material being pumped as noted above, presents a problem of maintaining a seal between the drive shaft and the pump housing. Thus for example, in the spinning process involving cellulose acetate, with acetone used as a solvent, frictional heat develops in the area of the bearing and shaft seal, which results in the evaporation of the solvent. This in turn leads to the hardening of the spinning material, and the galling or scoring of the bearing. Also, the packing seals which are installed in the sealing area become ineffective.

It is accordingly an object of the present invention to provide a drive shaft seal and sealing method for a gear pump of the type adapted to discharge and meter a solution of a polymeric material and solvent, and which overcomes the limitations and disadvantages of the prior art pumps.

It is a more particular object of the present invention to provide a drive shaft seal and sealing method for a gear pump wherein the solution of polymeric material does not leak through the packing seals and solidify by reason of the evaporation of the solvent, and such that the seal is not subject to deterioration resulting from solidified material.

These and other objects and advantages of the present invention are achieved in the embodiment illustrated herein by the provision of a method and apparatus which includes a gear pump comprising a housing having an inlet port and a discharge port, a pair of cooperating gears rotatably mounted within the housing and adapted upon rotation to convey a solution of polymeric material and solvent from the inlet port to the discharge port, and a drive shaft extending through the housing and operatively connected to one of the gears for transmitting rotational torque thereto. The drive shaft is rotatably supported in journal bearing means formed between the shaft and the housing, and the journal bearing means is in contact with the solution being pumped through the housing so as to be lubricated thereby. The pump of the present invention also includes means for sealing the drive shaft to the housing to effectively preclude leakage of the solution of polymeric material therebetween, with the sealing means being located on the side of the journal bearing means opposite the gears and including a pair of axially spaced apart annular packing seals surrounding the shaft so as to define an annular chamber extending axially between the packing seals. Also, means are provided for maintaining a shielding inert atmosphere in the annular chamber.

The phrase "shielding inert atmosphere" as used herein is intended to mean an atmosphere composed of gases which react with the solution of the dissolved polymeric material only very slowly or not at all, and thereby shield the dissolved polymeric material from oxidation or explosion in cases where the solvent is flammable. The particular gases are selected based upon these required properties and cost, and are preferably oxygen free. Suitable gases include argon, nitrogen, carbon dioxide, and mixtures thereof.

Preferably, the pump of the present invention also includes an outlet line having one end thereof communicating with the bottom portion of the annular chamber between the packing seals, for withdrawing any of the spinning solution of the polymeric material which reaches the annular chamber. Further, there is provided an air tight container operatively connected to the outlet line for receiving the withdrawn solution of the polymeric material, and the container also has a shielding inert atmosphere therein and it includes a valve for permitting the collected solution of the polymeric material to be periodically drained from the tank.

As a result of maintaining a shielding inert gas within the annular chamber, it has surprisingly been found that the solvent of the polymeric material, such as acetone in the case of cellulose acetate or methylene chloride in the case of triacetate, is prevented from evaporating, and that the polymeric material leaking into the annular chamber can be readily collected in the collecting container without the formation of crust-like solidified deposits on the drive shaft or seals. The present invention is also advantageous in that a constant biasing force may be applied to the annular packing seals, and the leakage rate and thus also the amount of lubricant for the bearing of the drive shaft can be controlled.

In order to periodically drain the withdrawn solution of the polymeric material from the collection container, there is preferably provided a valve mounted on the side wall of the container adjacent a fluid pump in the container. More particularly, a siphon plate is mounted in the fluid sump adjacent the opening of the valve, for preventing air from entering into the collection container during draining and thus mixing with the shielding atmosphere in the container and reaching the bearing section and the annular chamber between the packing seals. Also, the valve is designed so that gaps in the seal of any major length are avoided, which might become clogged by reason of the hardening of the spinning solution from its contact with the air. For this purpose, the valve includes a cone-shaped stopper which is joined to a spindle mounted horizontally in a valve casing, and which is adapted to be pressed against a valve seat which surrounds the opening in the side wall of the container. The valve seat may also be mounted to the valve casing so as to be replaceable.

During the periodic draining of the collection container, it will be understood that the liquid polymeric material will be discharged from the container under pressure, since the gas supplied to the annular chamber between the packing seals is preferably under pressure. As a result, the polymeric material solution will tend to splash against the cone-shaped valve stopper. However, to insure a smooth operation of the valve spindle and the sealing of the valve, the stopper may be provided with a relatively wide, radially extending collar, which protects the structural components located behind the stopper against being wetted by the polymeric material.

Some of the objects and advantages of the invention having been stated, others will appear as the description proceeds when taken in connection with the accompanying generally schematic drawings, in which FIG. 1 is a sectional front elevation view of a gear pump which embodies the features of the present invention;

FIG. 2 is a sectional top plan view of the pump shown in FIG. 1;

Figure 3:
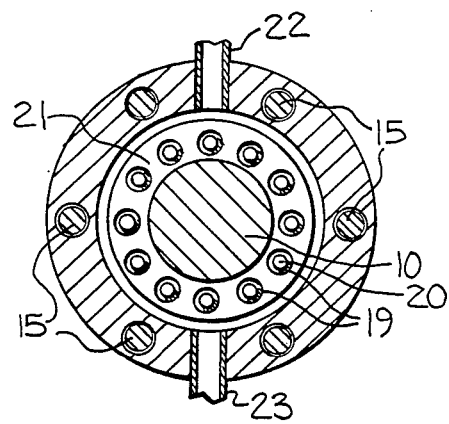
FIG. 3 is a sectional end view taken substantially along the line 3—3 of FIG. 2.

Referring more particularly to the drawings, FIGS. 1-3 illustrate a gear pump 1 embodying the features of the present invention, and which includes a housing having an inlet port A and a discharge port B. The housing is of a plate-type construction, and includes outside cover plates 2 and 3, base plates 4 and 5, and a central gland plate 6. Rotatably supported in the gland plate is a pair of cooperating gears 7 and 8, which mesh in a sealing section 9. The driven gear 7 is fixedly mounted to a drive shaft 10, and the shaft 10 includes cylindrical bearing portions or journals which are journaled in cylindrical bores in the base plates 4 and 5 on respective sides of the gear 7. The driven gear 8 includes similar cylindrical bearing portions or journals 11 which are journaled in the bores in the base plates 4 and 5 on each side of the gear 8. The plates of the gear pump are interconnected by bolts 12 distributed over its circumference, and sealed against leakage by suitable flat or profile gaskets.

The bearings for the drive shaft 10 include journals on each side of the gear 7 which are rotatably supported in the bores provided in the plates 4 and 5. These journal bearings are lubricated by the solution of the polymeric material, and the shaft extends outwardly from the cover plate 3 through a tubular stuffing box chamber 14. The chamber 14 is bolted to the cover plate 3 by the bolts 15, and thus may be considered a part of the pump housing. In the area of the cover plate 3, the drive shaft 10 forms a sealing gap with the bore 16. From there, the drive shaft is somewhat reduced in diameter so as to define two narrow ribs 13 substantially opposite from each other, and which serve as wipers for the polymeric material.

The stuffing box chamber 14 encloses the drive shaft 10, and contains the means for sealing the shaft to the housing. In particular, this sealing means includes a pair of axially spaced apart annular packing seals 17 and 18 which surround the shaft, and so as to define an annular chamber 21 formed between the shaft and chamber 14 of the housing, and between the packing seals 17 and 18. As illustrated, the innermost packing seal 17 is closer to the journal bearing in the plate 5, and the outermost packing seal 18 is furthest from such bearing. Also, each of the packing seals comprises a plurality of separate packing rings as illustrated in FIG. 2, and the annular chamber 21 is bridged by several springs 19 extending in the axial direction. More particularly, the springs 19 are distributed circumferentially about the shaft 10 in the annular chamber 21, and are each held between annular spring supports which mount a pair of axially aligned posts 20 for each spring.

The annular chamber 21 includes a radial inlet on its upper side and which communicates with the line 22, and an outlet at its lowest point which communicates with the line 23. Also, an annular flange 24 is mounted upon the shaft 10 at the end of the chamber 14 so as to contact the outside end of the outermost packing seal 18, and the flange 24 is mounted to the chamber 14 by means of bolts 25 to permit the packing seals 17 and 18 and springs 19 to be axially compressed, to thereby selectively adjust the sealing effect of the seals 17 and 18. The inlet line 22 of the chamber 14 is connected to a pressure tank 26 with the gas being maintained under a pressure P. The gas maintained in the tank 26 is substantially free of oxygen, and may for example comprise nitrogen or other shielding inert gas as defined above.

The shielding inert gas is preferably maintained above the outside atmospheric pressure so as to prevent air or oxygen from penetrating along the shaft through the flange 24 and packing seal 18 to the annular chamber 21. Typically, the pressure P is between about 0.1 to 0.6 bar.

The outlet line 23 is connected to a leakage collection container 27, which is positioned below the chamber 14 and the drive shaft 10, and so as to remove and collect the solution of the polymeric material which leaks along the drive shaft into the annular chamber 21.

Figure 4:
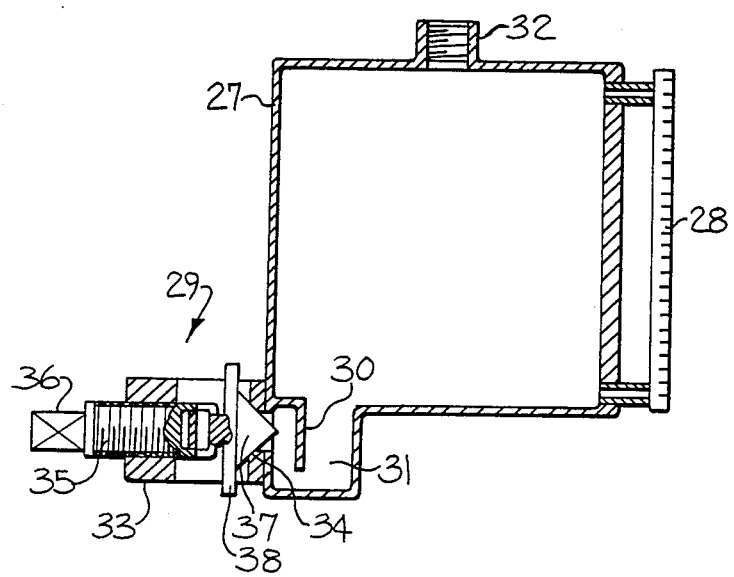
FIG. 4 is a fragmentary sectional and enlarged view of a collection container suitable for use with the present invention.

The leakage collection container 27 may take the form illustrated in FIG. 4, and the interior of the container is maintained in an oxygen free and shielding inert atmosphere. As a result, the solvent in the polymeric material is effectively prevented from evaporating. The container 27 includes an inlet 32 on its upper side which is connected to the line 23, and it includes a sump 31 adjacent the bottom. Also, the container may include a fluid level gauge in the form of sight glass 28, so that the tank may be periodically drained of the accumulated polymeric material via a valve 29 which is positioned adjacent the sump 31.

An outlet opening is provided in the outer side wall of the container adjacent the pump 31, and an angled plate 30 is mounted within the pump 31, so as to overlie the front and upper portions of the side wall opening and form a siphon, which is designed to prevent air from entering into the tank when the fluid level has dropped to the pump 31, and thus preserve the shielding inert atmosphere in the container and prevent the polymeric material in chamber 21 and in the container 27 from hardening. The valve 29 is mounted on the outside of the tank, and includes a casing 33, and a valve seat 34 which is positioned directly on the outside wall of the tank in alignment with the side wall opening. A valve spindle 35 is threadedly mounted in the valve casing 33, and the rearward end of the spindle 35 is in the form of a square 36 to facilitate rotation, such as for example by a hand wheel. The forward end of the spindle 35 mounts a cone-shaped stopper 37, and a radial anti-splash collar 38 is positioned immediately behind the stopper 37. The collar 38 thus prevents the polymeric material in solution from contacting the spindle 35 in the area behind the stopper 37, which could lead to the formation of solidified portions of the polymeric material on the spindle.

In the drawings and specification there has been set forth a preferred embodiment of the invention and although specific terms are employed, they are used in a generic and descriptive sense only and not for purposes of limitation.

That which is claimed is:

1. A method of pumping a solution composed of a polymeric material dissolved in a solvent, and comprising the steps of providing a gear pump which includes a housing having an inlet port and a discharge port, a pair of cooperating gears rotatably mounted within said housing and adapted upon rotation to convey a solution from said inlet port to said discharge port, a drive shaft extending through said housing and operatively connected to one of said gears for transmitting rotational torque thereto, and journal bearing means in said housing for rotatably supporting said drive shaft and with said journal bearing means being in contact with the solution being pumped through said housing so as to be lubricated thereby, feeding a solution of a dissolved polymeric material to the pump, rotating the drive shaft and the cooperating gears of the gear pump to convey the solution through the pump while contacting the journal bearing means of the shaft with the solution so as to lubricate the journal bearing means, maintaining an annular chamber about said drive shaft and between said drive shaft and said housing, with the annular chamber being located on the side of said journal bearing means opposite said gears, maintaining a shielding inert atmosphere in said annular chamber, and withdrawing to an air tight container any of the dissolved polymeric material which has leaked into the annular chamber.

2. The method as defined in claim 1 wherein the step of maintaining an annular chamber about said drive shaft includes maintaining a pair of axially spaced apart annular packing seals surrounding said shaft and such that said annular chamber is positioned between said packing seals.

3. The method as defined in claim 1 comprising the further step of periodically draining the withdrawn dissolved polymeric material from the air tight container.

4. The method as defined in claim 3 wherein the shielding inert atmosphere is selected from the group consisting of argon, nitrogen, carbon dioxide, and mixtures thereof.

5. The method as defined in claim 1 wherein the shielding inert atmosphere is maintained at a pressure above outside atmospheric pressure.

6. The method as defined in claim 5 wherein the polymeric material comprises cellulose acetate.

7. A gear pump adapted to convey a polymeric material dissolved in a fluid solvent and comprising a housing having an inlet port and a discharge port, a pair of cooperating gears rotatably mounted within said housing and adapted upon rotation to convey a dissolved polymeric material from said inlet port to said discharge port, a drive shaft extending through said housing and operatively connected to one of said gears for transmitting rotational torque thereto, said drive shaft being rotatably journaled in a bearing provided in said housing which is adapted to be lubricated by means of the dissolved polymeric material, means for sealing said drive shaft to said housing to effectively preclude leakage of the polymeric material therebetween, said sealing means including a pair of axially spaced apart annular packing seals positioned on the side of said bearing opposite said gears and surrounding said shaft so as to define an annular chamber extending axially between said packing seals, means for maintaining a shielding inert atmosphere in said annular space, and an outlet line having one end thereof communicating with the bottom portion of said annular chamber for withdrawing any of the dissolved polymeric material which has leaked into said annular chamber, and an air tight container operatively connected to said outlet line for receiving the withdrawn dissolved polymeric material.

8. The gear pump as defined in claim 7 wherein said sealing means further comprises a plurality of springs spaced circumferentially about said shaft within said annular chamber and extending axially between said pair of annular packing seals for transmitting a separating axial force between said pair of packing seals.

9. The gear pump as defined in claim 8 wherein said pair of packing seals include an innermost packing seal which is closer to said bearing and an outermost packing seal which is furthest from said bearing, and said outermost packing seal includes an outside end which faces away from said bearing, and said sealing means further comprises an annular flange mounted upon said shaft so as to engage said outside end of said outermost packing seal, and threaded means for interconnecting said flange to said housing so as to bias said outermost packing seal axially toward said annular chamber and said innermost packing seal.

10. The gear pump as defined in claim 7 further comprising valve means operatively connected to said air tight container for permitting the dissolved polymeric material to be periodically drained from said container without the entry of outside air into said container.

11. The gear pump as defined in claim 10 wherein said container includes a side wall, and said valve means comprises an opening in said container side wall, a circular valve seat surrounding said opening, a cone-shaped stopper, and means for supporting said stopper on the outside of said container for axial movement of said stopper toward and away from said valve seat.

12. The gear pump as defined in claim 11 wherein said valve means further comprises a radial collar mounted at the rearward end of said cone-shaped stopper for deflecting the dissolved polymeric material as it is being drained through said side wall opening and valve seat.

13. The gear pump as defined in claim 12 wherein said valve means further comprises siphon plate means mounted within said container and adjacent said side wall opening for preventing air from entering into said container and into said annular chamber through said side wall opening when said valve means is opened.

* * * * *